United States Patent
Louis

(10) Patent No.: US 11,997,487 B2
(45) Date of Patent: May 28, 2024

(54) WIRELESS POWER TRANSFER DEVICE AUTHENTICATION

(71) Applicant: Apple Inc., Cupertino, CA (US)

(72) Inventor: Jeffrey Douglas Louis, Auckland (NZ)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 17/454,876

(22) Filed: Nov. 15, 2021

(65) Prior Publication Data
US 2022/0181893 A1  Jun. 9, 2022

Related U.S. Application Data

(63) Continuation of application No. 16/586,547, filed on Sep. 27, 2019, now abandoned.

(51) Int. Cl.
| | | |
|---|---|---|
| H04W 12/069 | (2021.01) | |
| H02J 50/10 | (2016.01) | |
| H02J 50/80 | (2016.01) | |
| H04L 9/32 | (2006.01) | |
| H04W 12/03 | (2021.01) | |
| H04W 12/04 | (2021.01) | |
| H04W 12/041 | (2021.01) | |
| H02J 7/00 | (2006.01) | |

(52) U.S. Cl.
CPC ........... *H04W 12/069* (2021.01); *H02J 50/10* (2016.02); *H02J 50/80* (2016.02); *H04L 9/3271* (2013.01); *H04W 12/03* (2021.01); *H04W 12/04* (2013.01); *H04W 12/041* (2021.01); *H02J 7/00045* (2020.01)

(58) Field of Classification Search
CPC ........ H02J 50/80; H02J 50/10; H02J 7/00045; H04W 12/069; H04W 12/03; H04W 12/041; H04W 12/04; H04L 9/3271
See application file for complete search history.

(56) References Cited

U.S. PATENT DOCUMENTS

| | | | |
|---|---|---|---|
| 6,356,937 B1 * | 3/2002 | Montville | G06Q 10/109 719/329 |
| 9,906,956 B1 * | 2/2018 | Huang | H04W 12/0431 |
| 10,461,813 B2 * | 10/2019 | Louis | H04L 27/12 |
| 10,547,457 B1 * | 1/2020 | Duccini | H04L 9/50 |
| 2008/0232595 A1 * | 9/2008 | Pietrowicz | H04L 9/3297 380/277 |
| 2011/0083011 A1 * | 4/2011 | DiCrescenzo | H04L 63/0823 713/158 |
| 2011/0213968 A1 * | 9/2011 | Zhang | H04L 67/12 713/158 |
| 2015/0188912 A1 * | 7/2015 | Hoyos | G06F 21/33 726/10 |
| 2015/0271673 A1 * | 9/2015 | Lord | H02J 50/20 455/411 |

(Continued)

*Primary Examiner* — Gary S Gracia
(74) *Attorney, Agent, or Firm* — FLETCHER YODER PC

(57) ABSTRACT

A method for authentication for wireless power transfer which comprises: receiving an initial certificate signed using a private key associated with an intermediate certificate authority (CA) certificate; determining that the intermediate CA certificate is revoked; determining if a replacement certificate for the initial certificate exists; and if a replacement certificate for the initial certificate exists, trusting a wireless power transfer device associated with the initial certificate.

23 Claims, 5 Drawing Sheets

(56) References Cited

U.S. PATENT DOCUMENTS

| | | | |
|---|---|---|---|
| 2016/0050563 A1* | 2/2016 | Bronk | H04L 63/062 |
| | | | 726/7 |
| 2016/0119287 A1* | 4/2016 | Khazan | H04W 12/06 |
| | | | 726/12 |
| 2016/0347186 A1* | 12/2016 | Schnarr | B60L 53/00 |
| 2018/0241464 A1* | 8/2018 | Michaels | H04B 7/18539 |
| 2019/0044393 A1* | 2/2019 | Louis | H04B 5/79 |
| 2020/0154275 A1* | 5/2020 | Louis | H04W 12/03 |
| 2020/0282859 A1* | 9/2020 | Shin | B60L 53/68 |
| 2022/0212559 A1* | 7/2022 | Shin | H04L 9/0825 |

\* cited by examiner

WIRELESS POWER TRANSFER DEVICE AUTHENTICATION

CROSS REFERENCE TO RELATED APPLICATIONS

This application is a continuation of the U.S. patent application Ser. No. 16/486,547, filed on Sep. 27, 2019, the contents of which are incorporated herein in its entirety by reference.

FIELD

This relates generally to wireless power transfer device authentication.

BACKGROUND

Wireless power transfer devices may interact to transfer power. For example, a wireless power transmitter may transmit power to a wireless power receiver. In some cases, an authentication process may occur before wireless power transfer starts.

DETAILED DESCRIPTION

Figure 1:
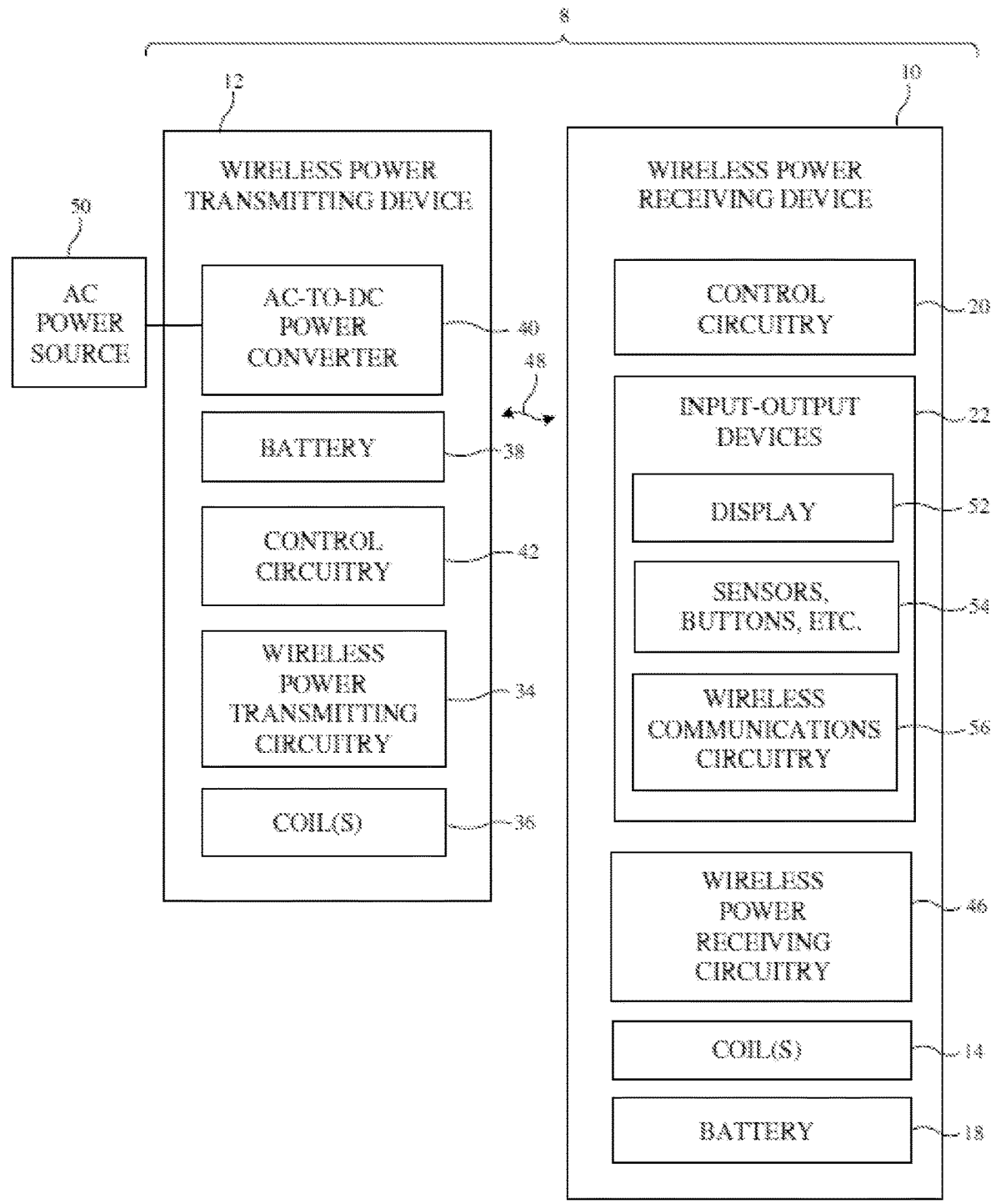
FIG. 1 is a schematic diagram of an illustrative wireless power system in accordance with some embodiments.

A wireless power system has a wireless power transmitting device (which may also be referred to in some instances as a wireless power transmitter or an inductive power transmitter) that transmits power wirelessly to a wireless power receiving device (which may also be referred to in some instances as a wireless power receiver or an inductive power receiver). The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to generate an alternating magnetic field and to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Wireless power transmitting and receiving devices can be designed to cooperate specifically with each other. For example, the size, shape, number, dimensions and configuration of coils of one or both of the devices may be selected based on the other device. Magnetic elements may also be included in the transmitting and/or receiving device, and the size, shape, number, dimensions and configuration of the magnetic elements may be selected based on the other device.

In some cases, wireless power transmitting and receiving devices can be designed to be closely coupled to each other. Typically, this is achieved by arranging the coils of the transmitting and receiving devices such that they are aligned with and close to each other in use. Systems in which the transmitting and receiving devices can be closely coupled to each other in use are sometimes referred to as inductive power transfer systems. Transmitting and receiving devices that can be closely coupled to receiving devices can be referred to as inductive power transfer devices.

Wireless power transmitting and receiving devices can also be designed to cooperate with each other in particular orientations, positions or other spatial relationships. For example, some receiving devices may have a preferred position or orientation with respect to a transmitting device. This preferred position or orientation may allow for good coupling for efficient power transfer, minimum leakage of the magnetic field and other advantageous effects. The transmitting and/or receiving devices may have visual markings to indicate where or in what orientation to place the receiving device, engaging elements to hold the receiving device in a particular position or orientation, magnetic couplings or other biasing elements to urge the receiving device towards a particular position or orientation, or other arrangements.

Wireless power transmitting and receiving devices can also be used with other devices without being specifically designed to cooperate with them. For example, a wireless power transmitting device can operate with many different types of receiving devices having different coil arrangements, different (or no) magnetic elements, sizes, shapes and other characteristics. A wireless power receiving device can operate with many different types of transmitting devices having different coil arrangements, different (or no) magnetic elements, sizes, shapes and other characteristics.

Wireless power transmitting and receiving devices can also be used in various orientations, positions or other spatial relationships. For example, wireless power transmitting or receiving devices may be provided without visual markings, engaging elements, magnetic couplings or other biasing elements, or other arrangements. Alternatively, transmitting or receiving devices may have these arrangements but still operate in various other orientations and positions.

The term "coil" may include an electrically conductive structure where an electrical current generates a magnetic field. For example, inductive "coils" may be electrically conductive wire in three dimensional shapes or two dimensional planar shapes, electrically conductive material fabricated using printed circuit board (PCB) techniques into three dimensional shapes over plural PCB "layers", and other coil-like shapes. Other configurations may be used depending on the application. The use of the term "coil", in either singular or plural, is not meant to be restrictive in this sense.

An illustrative wireless power system is shown in FIG. 1. As shown in FIG. 1, a wireless power system 8 includes a wireless power transmitting device 12 (which may also be referred to in some instances as an inductive power transmitter) and one or more wireless power receiving devices such as wireless power receiving device 10 (which may also be referred to in some instances as an inductive power receiver). Device 12 may be a stand-alone device such as a wireless charging mat, may be built into furniture, laptop or tablet computers, cellular telephones or other electronic devices, or may be other wireless charging equipment. Device 10 is a portable electronic device such as a wristwatch, a cellular telephone, a tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. For example, in one embodiment electronic device 10 is a tablet computer and electronic device 12 is a stylus configured to attach to electronic device 10 (tablet) and be wirelessly (e.g., inductively) charged by electronic device 10 (tablet). Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can be included to convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to generate an alternating magnetic field and to transmit alternating-current wireless power signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time-varying magnetic field (wireless power signals 48) or "flux" is generated, that is received by one or more corresponding coils 14 electrically connected to wireless power receiving circuitry 46 in receiving device 10. If the time-varying magnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in sensing for foreign or other non-receiver objects (e.g.: metallic objects such as coins or RFID tags within electronic devices), determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example, device 12 and/or device 10 may communicate using in-band communications injected or combined into the wireless power signals 48 such as proposed in the Wireless Power Consortium Qi specification 1.2.3, which is incorporated herein by reference. Alternatively, a separate Bluetooth, RFID, NFC, Zigbee, WiFi, RF or other communication system may be employed.

Authentication

In some cases, it may be useful for a first "initiator" device to establish trust in a second "responder" device before wireless power transfer starts. Additionally or alternatively, the initiator device may establish trust in the responder device before the initiator device provides enhanced or premium functionality, if this is intended to be dependent on trusting that the responder exhibits compliant behavior specified by a standards organization (such as a certification lab or agency). A first wireless power transfer device adopting the role of the initiator (such as a wireless power transmitter or wireless power receiver) may attempt to authenticate a second wireless power transfer device adopting the role of the responder (such as a wireless power receiver or wireless power transmitter). This may occur by the second wireless power transfer device (the responder) sending a certificate or a certificate chain containing a public key for the second wireless power transfer device to the first wireless power transfer device (initiator). The certificate, or certificates within the certificate chain, are digitally signed by one or more certificate authorities (CAs). By validating the digital signatures, the first wireless power device (initiator) can establish trust in the certificate provided by the second wireless power device. The initiator device may then verify that the responder device owns the certificate by issuing a challenge nonce message. The responder can use a private key to produce a digital signature that proves to the initiator that the responder is in possession of a private key that corresponds to the public key contained within the trusted certificate. The initiator is thus able to establish trust in a responder that proves that the responder possesses a private key corresponding to the public key of a certificate digitally signed by an entity or entities trusted by the initiator.

This makes use of public-key cryptography. Public-key cryptography is a cryptosystem which uses a complementary pair of keys: a public key which can be freely available and a private key which is kept secret. The public key and private key are chosen such that a message is encrypted or verified as authentic by using a first of either the public key or the private key to produce a ciphertext result that can be decrypted or have been signed using the other of the public key and private key. This allows for a public key to be used to encrypt or verify a message which only the holder of the private key can decrypt or sign. The public key and private key may be stored in a compressed format or represented using elliptic-curve cryptography or any other approach. The public key and private key may be assigned or chosen by using any approach that has the property of a cryptographic one-way hash function which makes it infeasible to determine a private key from a given public key and ciphertext signatures or encrypted messages.

Figure 2:
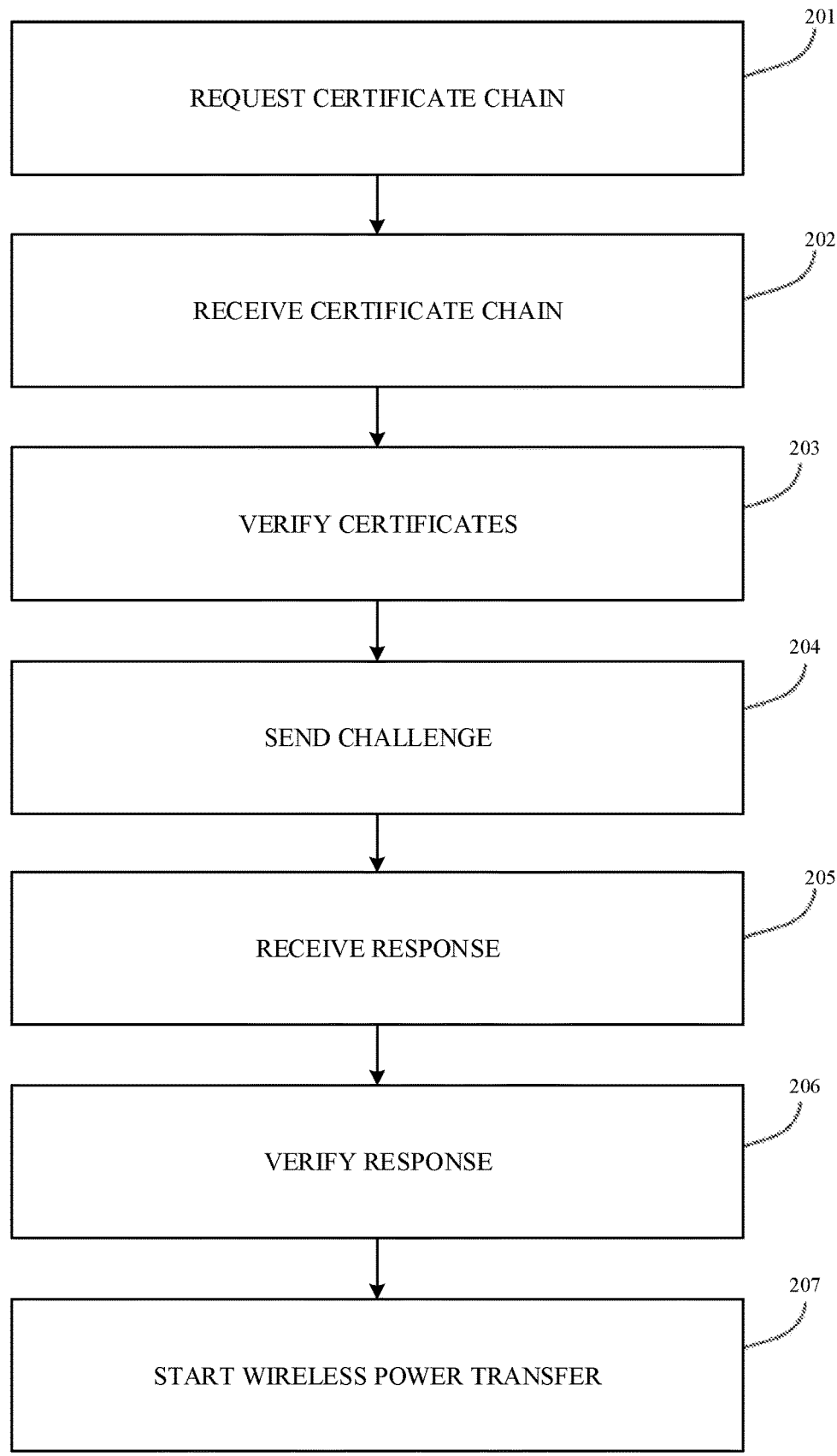
FIG. 2 is a flow chart of an approach for authentication between two wireless power transfer devices in accordance with some embodiments.

FIG. 2 shows an approach to authentication between two wireless power transfer devices. The first wireless power transfer device (such as a wireless power transmitter) may be an initiator and a second wireless power transfer device (such as wireless power transmitter) may be a responder. The initiator is the party which is attempting to verify whether the responder can be trusted. The responder is the party which is trying to prove that it can be trusted.

At step 201, the initiator requests a certificate chain for the responder.

The initiator may send a suitably configured message to the responder. This may occur after an initial handshake between the initiator and the responder occurs to establish communication between the initiator and the responder.

In some cases, only a certificate is requested, instead of a certificate chain. For example, if a certificate is signed directly by a root CA, only the certificate may be requested.

At step 202, the initiator receives the certificate chain for the responder.

The certificate chain comprises a sequence of certificates. Each certificate is issued by an issuer (such as a CA) for a subject (such as a wireless power transfer device or other CA). The purpose of a certificate is for the issuer to vouch for the subject. On receiving the certificate, if the issuer and its signature for the certificate can be trusted, then the subject of the certificate can be trusted. The signature and contents of a certificate can be trusted when cryptographic criteria are satisfied when combined with a trusted public key to establish that the signature was produced for the certificate in combination with the corresponding private key.

Each certificate may comprise a serial number uniquely assigned by the issuer, an identifier of the issuer, and a public key for the subject, and a signature. The signature is a hash (such as a SHA-256 hash) of predetermined contents of the certificate (such as the serial number, the identifier of the issuer, and the public key) encrypted using a private key of the issuer.

The identifier of the issuer may be a reference to another certificate. For example, the identifier of the issuer may the hash or serial number of another certificate.

To verify a certificate, the public key of the issuer may be obtained from another trusted certificate via wide area network, firmware update, or stored in the device during manufacture. This can be identified using the identifier of the issuer. If this public key can be successfully combined with a hash value (such as a SHA-256 hash value) formed from the certificate content to satisfy the cryptographic criteria that establishes that the private key was used to produce the signature, this verifies that the signature was generated by the issuer. This is because it is infeasible (that is, expected to be impossible within a reasonable time frame and with reasonable computing resources) to compute a private key from a public key. Therefore, assuming a private key is secret, only the party which holds that private key could generate a certificate signature that will fulfill the cryptographic criteria produced by the corresponding public key and the certificate content.

The certificate chain comprises a sequence of certificates. A chain may begin with a root CA certificate that is implicitly trusted by possession, or by virtue of having been provisioned to the device via a trusted source such as during the manufacturing process. Since the root CA certificate or at least its public key may be provisioned within the initiator device in order that it may trust a certificate chain published by a responder device, the root CA certificate may be omitted from the certificate chain published by a responder to reduce storage space. Where the root certificate is omitted from the certificate chain, it may be replaced by a signature of the root CA certificate to facilitate identification or verification of the correct root CA certificate. For example, in a certificate chain published by a responder device, there may be a root CA certificate signature and at least two certificates: one for an intermediate CA (such as a manufacturer of a wireless power transfer device), and one for a device (such as the wireless power transfer device).

A first certificate (such as an intermediate CA certificate) in a published certificate chain is signed by a root CA. This means that the first published certificate comprises a public key for verifying the next certificate and a signature from the root CA to authenticate the certificate. The signature may be a hash of certain contents of the first certificate and then encrypted using a private key of the root CA.

Each subsequent certificate in the certificate chain has a signature generated using a private key corresponding to a public key of a preceding certificate. That preceding certificate may be identified using the identifier of the issuer. So, a second certificate in the certificate chain has a signature encrypted using a private key corresponding to a public key in the first certificate in the certificate chain.

The final certificate in the certificate chain corresponds to the responder.

At step 203, the initiator verifies the certificates in the certificate chain. This may involve determining, for each certificate within the certificate chain, whether there is a signature for the certificate generated by a trusted CA.

The first certificate in the published certificate chain is signed by a root CA. The public key of the root CA may be known in advance. Where the root CA uses multiple public-public key pairs and thus multiple root CA certificates, the certificate chain may indicate which root certificate is to be used, for example by publishing an identifier as a hash (such as a SHA-256 hash) of the root CA certificate for the appropriate public-private key pair that is being used. The signature in the first certificate is then encrypted using the appropriate public key for use by the root CA. For example, this may involve using an elliptic-curve digital signature algorithm (ECDSA) such as ANSI standard X9.62-2005 to generate a signature of predetermined contents of the certificate, excluding the signature itself. If the signature verification process computed on the certificate contents, signature, and the public key is successful, this proves that the signature was generated using the private key possessed by the root CA. This is because the private key of a root CA is secret, such that only that root CA could generate the signature. Since root CAs are implicitly trusted, the root CA certificate (and a public key in the root CA certificate) must be trustfully provisioned within an initiator device so that it can be trusted. It may thus be replaced by a plain hash signature, such as a SHA-256 hash, in the certificate chain published by a responder device.

Each subsequent certificate is verified using the public key of the preceding certificate. Since the issuer of the preceding certificate has signed each subsequent certificate, since the preceding certificate has already been verified, and since only the issuer of the preceding certificate is expected to have the private key required to sign such a subsequent certificate, this allows each subsequent certificate to be trusted. This provides a chain of trust. That is, there is a sequence of certificates which provide that as long as the root CA is trusted, the public key of the device can be trusted.

Conversely, if one of the certificates in the certificate chain cannot be verified, then the verification fails. This may result in the initiator foregoing wireless power transfer with the responder. Alternatively, this may result in the initiator implementing a system policy behavior for untrusted devices such as foregoing wireless power transfer at a higher power (such as around 10 W) with the responder, and instead providing wireless power transfer at a lower power (such as around 5 W).

A result of verifying the certificate chain may be that a device which has a private key corresponding to the public key can be trusted.

It may remain to determine that the responder has a private key corresponding to the trusted public key. That is, a responder being able to provide a valid certificate chain may not be sufficient to prove that the certificate chain relates to that responder.

Determining this may involve a challenge-response authentication process. In some cases, this may occur before step 201, 202, and 203. This would mean that the device proves it has a particular private key before determining whether a device having that private key is trusted.

At step 204, the initiator sends a challenge to the responder. The challenge may be a message comprising a nonce (such as a random 128-bit number).

At step 205, the initiator receives a response to the challenge. The response comprises a digital signature for the nonce encrypted using the responder's private key. This encryption may use the elliptic curve digital signature algorithm (ECDSA) specified in ANSI standard X9.62-2005 in combination with a SHA-256 hash value computed from the nonce.

At step 206, the initiator verifies the response, for example by using the elliptic curve digital signature algorithm (ECDSA) specified in ANSI standard X9.62-2005. This may involve decrypting the private-key-encrypted hash value of the nonce by using the public key associated with the device. If this results in the non-encrypted hash value of the nonce, then this is proof that the responder has the private key corresponding to the public key. If this does not result in the non-encrypted hash value of the nonce, then the verification fails. Alternatively, use of ECDSA may instead look for equal values of the position co-ordinate "x" published as an ECDSA signature component value "r", with that of the position co-ordinate "x" determined by the elliptic curve point representation of a value computed from the hash value, public key, and ECDSA signature component value "s". Failed verification may result in the initiator foregoing wireless power transfer with the responder. Alternatively, failed verification may result in the initiator implementing a system policy behavior for untrusted devices such as foregoing wireless power transfer at a higher power (such as around 10 W) with the responder, and instead providing wireless power transfer at a lower power (such as around 5 W).

The verification of step 206 complements the verification of step 203. That is, a result of step 203 is that a device having a particular private key can be trusted. A result of step 206 is that the responder has that private key. Therefore, a result of these steps in combination is that the responder can be trusted.

At step 207, the initiator may start wireless power transfer with the trusted responder. This may involve the initiator starting to provide a sustained flow of wireless power to allow for charging and/or powering a load at the trusted responder. This may be in accordance with a system policy behavior for trusted devices, such as permitting wireless power transfer at a higher power (such as around 10 W), in contrast to a lower power (such as around 5 W) permitted for untrusted devices.

In some cases, further authentication, configuration, or other interaction may occur between the initiator and the responder before step 207 occurs.

As noted above, verification performed at step 203 assumes that if an issuer's private key has been used to sign a certificate, then only the issuer could have generated that signature. That is, private keys are assumed to be secret to the issuer.

If a private key is compromised (for example, by being made public), this means that a certificate may be signed by a party other than the issuer. A signature generated using that private key is then no longer sufficient to prove that the issuer vouches for the subject of the certificate. Any certificate signed with that private key should no longer be considered valid.

When a private key is compromised, it can be useful to advise initiators of this compromise. In some cases, this may be implemented using a certificate revocation list. The certificate revocation list comprises a list identifying any certificate having a public key corresponding to a private key that has been compromised.

That is, when an intermediate CA is an issuer of a certificate in a certificate chain, then that certificate chain comprises an intermediate CA certificate which has a public key of the intermediate CA corresponding to a private key of that intermediate CA.

If that private key is compromised, the intermediate CA certificate which comprises a public key corresponding to that private key can be added to the certificate revocation list.

The certification revocation list may be propagated to initiators periodically. If a certificate chain contains a certificate on the certificate revocation list, then the certificate chain may not be verified.

Figure 3:
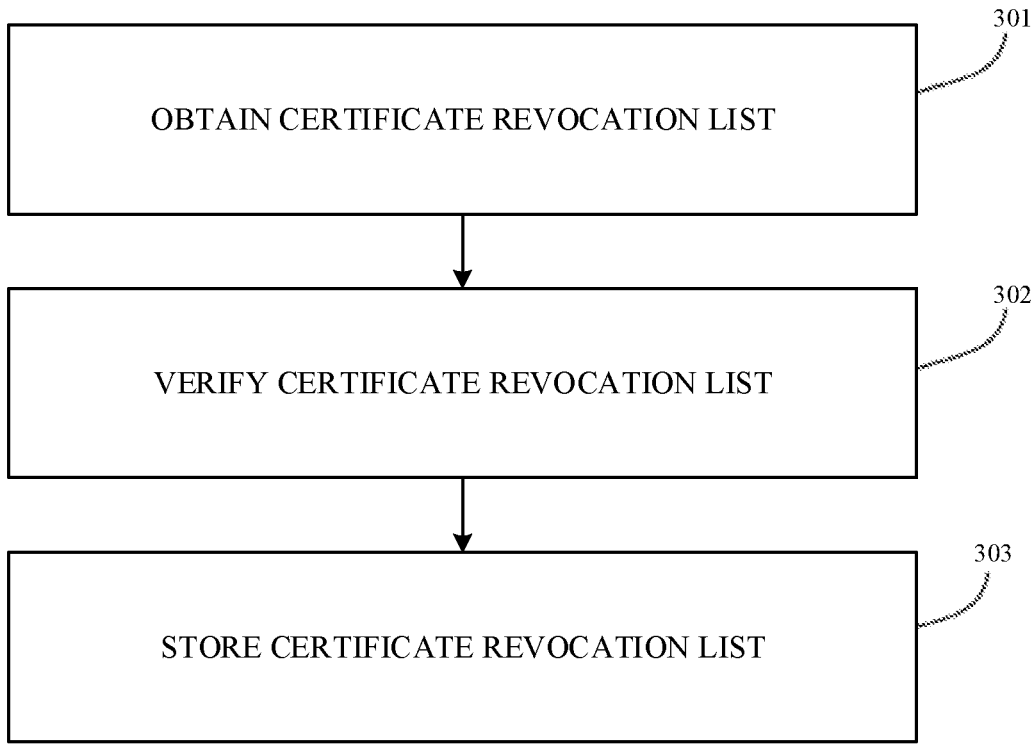
FIG. 3 is a flow chart of an approach for obtaining a certificate revocation list in accordance with some embodiments.

FIG. 3 shows an example of how an initiator may obtain a certificate revocation list.

At step 301, the initiator obtains a certificate revocation list.

Obtaining the certificate revocation list may occur by the initiator obtaining the certificate revocation list from a trusted source. The root CA may maintain an URL which links to a current certificate revocation list.

The certificate revocation list may be signed by a trusted party, such as a root CA. For example, the certificate revocation list may comprise a signature computed from a hash, such as an ECDSA X9.62 signature computed from a SHA-256 hash, of the list of revoked certificates encrypted with a private key of the root CA.

At step 302, the initiator verifies the certificate revocation list.

This may involve verifying a signature of the certificate revocation list, for example by using ECDSA X9.62 to verify the signature using a public key of the root CA and a calculated hash of the list of revoked certificates. If the signature verification process is successful, the certificate revocation list can be trusted to have been validated or published by the root CA.

At step 303, the initiator stores the certificate revocation list.

This allows the certificate revocation list to be used subsequently during certificate verification.

While steps 301 to 303 may occur in every authentication process, in many cases, steps 301 to 303 occur less frequently. Updates to the certificate revocation list may be pushed to initiators, such that the initiator is caused to perform steps 301 to 303 when the certificate revocation list is changed or republished. Additionally or alternatively, steps 301 to 303 may occur periodically (such as every three months), or whenever the initiator receives an update as part of a firmware or software update process.

Figure 4:
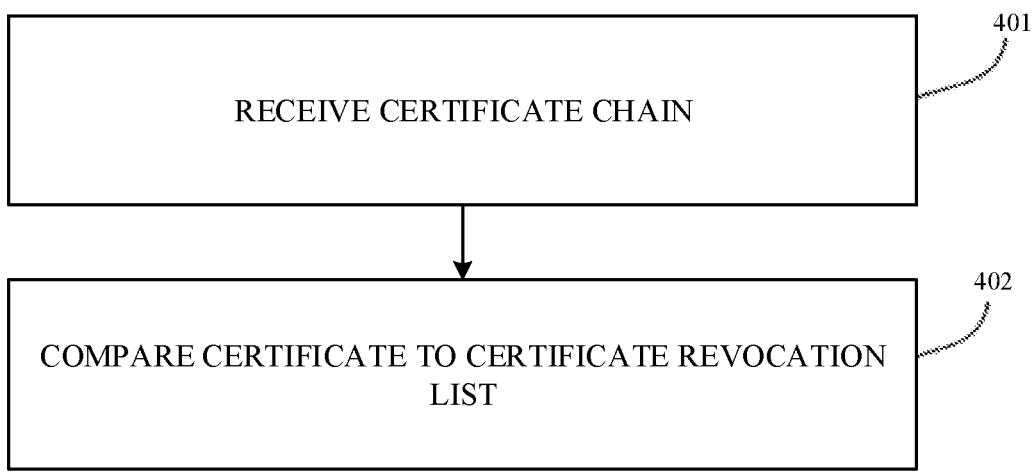
FIG. 4 is a flow chart of an approach for using a certificate revocation list in accordance with some embodiments.

FIG. 4 shows an example of how an initiator may use the certificate revocation list in verifying a certificate chain.

At step 401, the initiator receives a certificate chain. This may be the same as step 202.

At step 402, each certificate in the certificate chain is compared to the certificate revocation list.

If a certificate in the certificate chain matches a certificate in the certificate revocation list, the certificate (and thus a certificate chain comprising that certificate) may not be verified.

If any certificate in the certificate chain has been revoked, then any subsequent certificates in that certificate chain cannot be trusted. This is because it is unknown whether the issuer has signed the subsequent certificate or whether an intervening party has obtained the compromised private key and signed the subsequent certificate.

Therefore, a certificate chain which comprises a revoked certificate may not be verified even the certificate chain otherwise comprises a valid chain of signed certificates.

In some cases, step 203 may comprise the approach of FIG. 4.

An effect of a certificate revocation list may be that certificate chains of devices become invalid if an intermediate CA certificate has been revoked. This means a device may become untrusted despite there being no change to the device at all. If a valid certificate chain is a prerequisite for selectively obtaining behaviors defined as the initiator's system policy for trusted devices, this may mean that an otherwise fully operable device is no longer able obtain behaviors defined as the initiator's system policy for trusted devices, for example wireless power transfer at a higher power (such as around 10 W) rather than a lower power (such as around 5 W). Because of this, revoking intermediate CA certificates may involve a lot of collateral damage, by rendering some features of operable devices inoperable or less operable.

Replacement Certificates

One approach to mitigate collateral damage caused by revoking an intermediate CA certificate is to make use of replacement certificates.

When an initiator finds that a certificate in a certificate chain for a responder is revoked, the initiator may determine whether a replacement certificate chain for that certificate exists. If a replacement certificate chain exists, the replacement certificate chain may be treated as if it had been provided by the responder device itself.

A replacement certificate chain's last certificate (which may be a product unit certificate) may comprise a public key for the responder and a serial number of the certificate in the certificate chain. The public key and the serial number in the replacement certificate are typically identical to those of the certificate in the certificate chain of the responder which was signed by the revoked intermediate CA certificate. This replacement certificate can be used to validate a responder's certificate even where the signature in the certificate can no longer be trusted.

The replacement certificate chains may be generated when an intermediate CA certificate should be revoked. These may be generated based on records at the intermediate CA of signatures which were signed using the private key for that intermediate CA certificate. The records of an intermediate CA typically indicate the serial number and the public key of the certificates that were signed throughout the operating life of the CA.

The replacement certificate chains may be in a certificate replacement list which is distributed to initiators.

Figure 5:
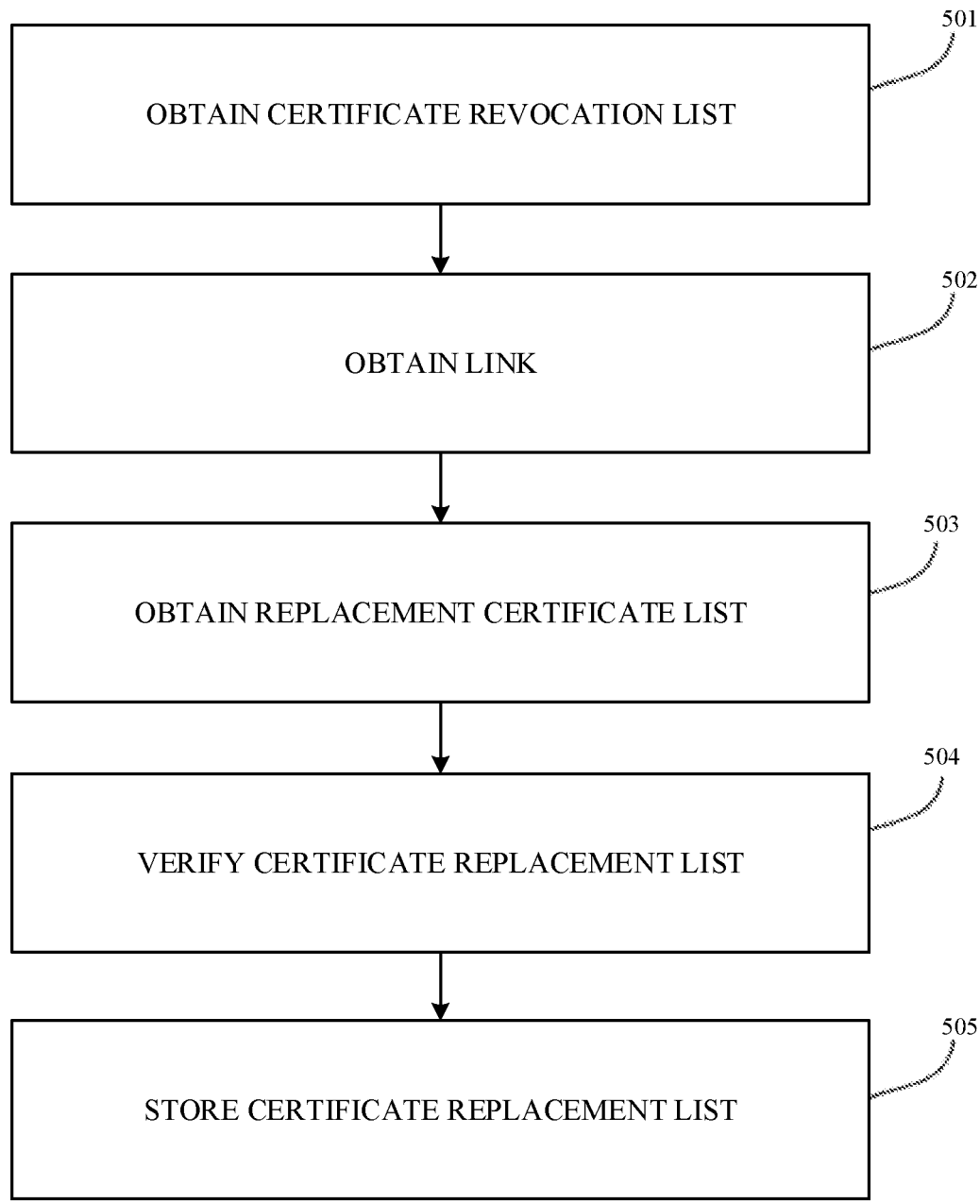
FIG. 5 is a flow chart of an approach for obtaining a certificate replacement list in accordance with some embodiments.

FIG. 5 shows an example approach for how the certificate replacement list is obtained.

At step 501, the initiator obtains a certificate revocation list. As noted above in FIG. 3, this may occur in different ways.

At step 502, the initiator obtains a location for one or more replacement certificate lists in the certificate revocation list.

Each replacement certificate list may correspond to one entry in the certificate revocation list, and the location may be in the certificate revocation list associated with an entry of the certificate revocation list. The location may be a URL (or more generally a pointer to a WAN, LAN, or other network location) which relates to a replacement certificate list provided by a trusted party, such as a root CA. The location may be referred to as a link.

At step 503, the initiator obtains a replacement certificate list. This may comprise downloading the replacement certificate list using the location information.

The certificate replacement list may be signed by a trusted party. For example, the certificate replacement list may comprise a hash, such as a SHA-256 hash, of the list of replacement certificates encrypted with a private key of the root CA, or by an ECSDA signature described by ANSI X9.62.

At step 504, the initiator verifies the certificate replacement list.

This may involve verifying the signature of the certificate replacement list, for example by decrypting the signature using a public key of the root CA and comparing the non-encrypted hash value decrypted from the signature with the value calculated as a hash of the list of replacement certificates. If these are identical, the certificate replacement list can be trusted to have been validated or published by the root CA. Alternatively ECDSA described in ANSI X9.62 may be used to verify a corresponding ECDSA signature provided with the certificate replacement list.

At step 505, the initiator stores the certificate replacement list.

This allows the certificate replacement list to be used subsequently during certificate verification.

In alternative embodiments, the replacement certificate list is incorporated into the certification revocation list. By obtaining the certificate revocation list, the initiator also obtains the replacement certificate list.

Figure 6:
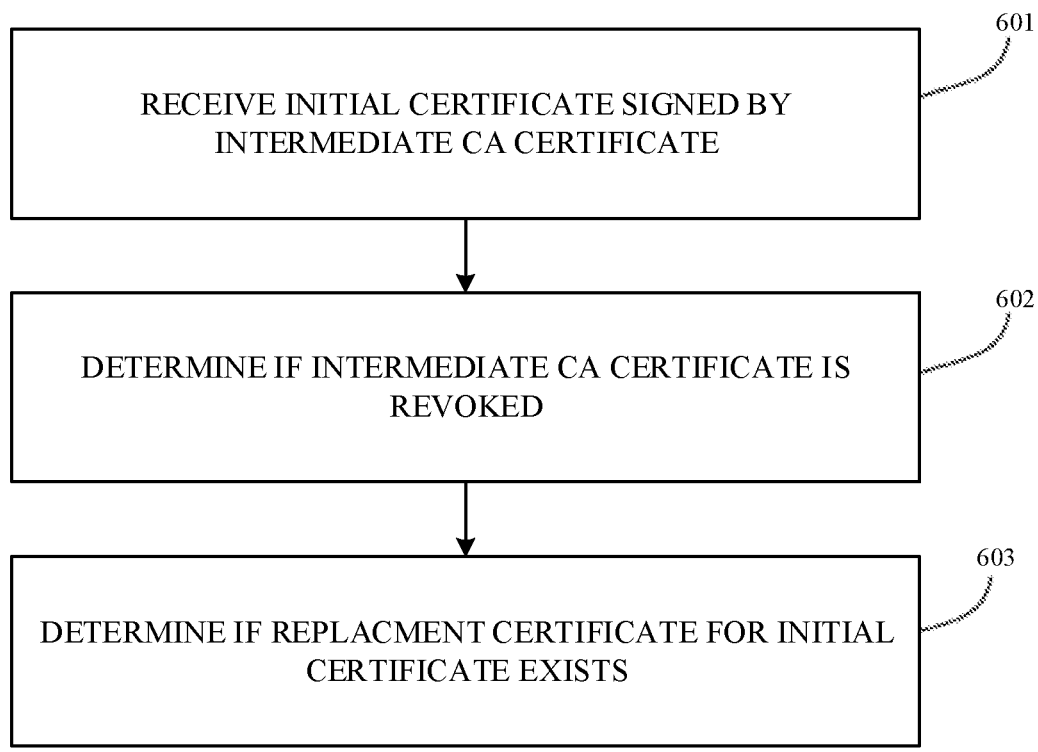
FIG. 6 is a flow chart of an approach for using a replacement certificate in accordance with some embodiments.

FIG. 6 shows an approach for how replacement certificates may be used at an initiator.

At step 601, the initiator receives an initial certificate signed using a private key associated with an intermediate CA certificate.

The initial certificate may be a certificate in a certificate chain of a responder. The initial certificate may be a leaf certificate in the certificate chain (that is, may be a certificate which comprises a public key for the responder).

The initial certificate may have an identifier of a preceding certificate in the certificate chain (such as the identifier of the issuer). This may be an identifier of the intermediate CA certificate.

At step 602, the initiator determines whether the intermediate CA certificate is revoked.

This may involve querying a certificate revocation list for the intermediate CA certificate. If the preceding certificate for the initial certificate is on the certificate revocation list, then the intermediate CA certificate is revoked. This means that any signature generated using the private key corresponding to the public key in the intermediate CA certificate cannot be trusted to have been signed by the intermediate CA. The initial certificate is therefore not trusted.

At step 603, the initiator determines whether a replacement certificate for the initial certificate exists.

This may involve obtaining a replacement certificate list (for example, using the approach shown in FIG. 5) and querying the certificate replacement list for a replacement certificate for the initial certificate. Querying may mean determining whether a public key and a serial number of the initial certificate appear on the certificate replacement list.

If the replacement certificate exists with the same public key value, this can be used to determine that the initial certificate should be trusted even if the signature in the initial certification cannot be trusted. Because the replacement certificate list is issued by a trusted authority, any initial certificate with a public key value corresponding to a replacement certificate list entry can be trusted. The replacement certificate therefore acts as an alternative verification for the signature of the initial certificate.

If the replacement certificate does not exist, then the initial certificate remains untrusted. This may mean that the responder is not verified, and so the initiator may forego wireless power transmission with the responder.

Therefore, even if an intermediate CA certificate has been revoked (which would otherwise cause a certificate chain to be untrusted), an initial certificate of a responder signed by the revoked intermediate CA may still be verifiable through the replacement certificate list. This may allow an intermediate CA certificate to be revoked with reduced collateral damage.

Moreover, because a replacement certificate need not contain any sensitive information, there is no need for replacement certificates to be restricted access. For example, if a replacement certificate only contains a public key (which is inherently non-secret) and a serial number of the initial certificate, a malicious third party could not use this replacement certificate to authenticate a different device. This is because while the replacement certificate would allow the different device to emulate the trusted certificate chain, they may still not have the private key and so may consequently fail a challenge-response authentication.

This therefore reduces the chance that a third party could impersonate a trusted device.

Certificate Authority

As noted above, the initiator may obtain a certificate revocation list and a replacement certificate list. In some cases, these are provided by a CA (such as a root CA).

In response to one or more requests, the CA may provide a certificate revocation list comprising one more revoked intermediate CA certificates. The CA may further provide a replacement certificate list. Each entry of this may relate to an initial certificate of a wireless transfer device, such as a responder, which has been signed by a private key corresponding to a public key of one or more of the revoked intermediate CA certificates.

The certificate revocation list and/or the replacement certificate list may be themselves signed using a private key of the CA. This can allow a recipient (such as an initiator) to verify that the certificate revocation list and/or the replacement certificate list were issued by the CA. Alternatively the replacement certificate list may incorporate a replacement intermediate certificate from another trusted intermediate CA to re-establish a chain of trust from the root CA to the replacement product unit certificate that incorporates a new signature.

The foregoing is merely illustrative and various modifications can be made to the described embodiments. The foregoing embodiments may be implemented individually or in any combination, and elements from one embodiment may be combined with others.

The invention claimed is:

1. A method performed by an initiator inductive power transfer device for authentication for inductive power transfer with a responder inductive power transfer device, the method comprising:
   receiving from the responder inductive power transfer device an initial certificate associated with the responder inductive power transfer device signed using a private key associated with an intermediate certificate authority (CA) certificate;
   determining that the intermediate CA certificate is revoked;
   determining, independently of the responder inductive power transfer device, when a replacement certificate for the initial certificate exists; and
   when the replacement certificate for the initial certificate exists, initiating inductive power transfer with the responder inductive power transfer device;
   when the replacement certificate for the initial certificate does not exist, initiating wireless power transfer with the responder inductive power transfer device in accordance with a system policy of the initiator inductive power transfer device for untrusted devices.

2. The method of claim 1 wherein initiating inductive power transfer with the responder inductive power transfer with the device in accordance with a system policy of the initiator inductive power transfer device for untrusted devices comprises foregoing inductive power transfer with the responder inductive power transfer device associated with the initial certificate.

3. The method of claim 1 wherein initiating inductive power transfer with the responder inductive power transfer with the device in accordance with a system policy of the initiator for untrusted devices comprises initiating wireless power transfer with the responder inductive power transfer device at a lower power level than for trusted devices.

4. The method of claim 1, wherein determining that the intermediate CA certificate is revoked comprises querying a certificate revocation list for the intermediate CA certificate.

5. The method of claim 1, further comprising
   obtaining a replacement certificate list; and
   querying the replacement certificate list for a replacement certificate for the initial certificate.

6. The method of claim 5, wherein the replacement certificate list comprises one or more public keys, each public key being associated with a revoked intermediate CA certificate.

7. The method of claim 6, wherein querying the replacement certificate list for a replacement certificate for the initial certificate comprises determining if the replacement certificate list comprises a public key of the initial certificate.

8. The method of claim 5, wherein obtaining the replacement certificate list comprises:
   obtaining a link from a certificate revocation list, the link being associated with an entry in the certificate revocation list, the entry associated with the intermediate CA certificate; and
   obtaining the replacement certificate list using the link.

9. The method of claim 5, wherein obtaining a replacement certificate list comprises obtaining a certificate revocation list, wherein the certificate revocation list comprises the replacement certificate list.

10. The method of claim 5, wherein the replacement certificate list is signed by a root CA.

11. The method of claim 5, wherein the initial certificate comprises a public key, and the replacement certificate comprises the public key.

12. The method of claim 5, wherein the replacement certificate comprises a serial number of the initial certificate.

13. The method of claim 1, wherein the initial certificate is part of a certificate chain.

14. A method performed by an initiator inductive power transfer device for authentication for inductive power transfer with an initiator inductive power transfer device, the method comprising:
   receiving from the responder inductive power transfer device an initial certificate associated with the responder inductive power transfer device signed using a private key associated with an intermediate certificate authority (CA) certificate;
   determining that the intermediate CA certificate is revoked;
   determining, independently of the responder inductive power transfer device, when a replacement certificate for the initial certificate exists; and
   when the replacement certificate for the initial certificate exists, performing challenge-response authentication with the responder inductive power transfer device, wherein: when the challenge-response authentication is successful, the method further comprises initiating inductive power transfer with the responder inductive power transfer device in accordance with a system policy of the initiator inductive power transfer device for trusted devices;
   when the challenge-response authentication is not successful, the method further comprises initiating inductive power transfer with the responder inductive power transfer device in accordance with a system policy of the initiator inductive power transfer device for untrusted devices.

15. The method of claim 14, wherein initiating inductive power transfer with the initiator inductive power transfer device in accordance with a system policy of the initiator inductive power transfer device for trusted devices comprises initiating inductive power transfer.

16. The method of claim 14, wherein initiating inductive power transfer with the initiator inductive power transfer device in accordance with a system policy of the initiator inductive power transfer device for trusted devices comprises initiating inductive power transfer at a higher power level than for untrusted devices.

17. The method of claim 14, wherein initiating inductive power transfer with the initiator inductive power transfer device in accordance with a system policy of the initiator inductive power transfer device for untrusted devices comprises initiating wireless power transfer at a lower power level than for trusted devices.

18. The method of claim 14, wherein initiating inductive power transfer with the initiator inductive power transfer device in accordance with a system policy of the initiator inductive power transfer device for untrusted devices comprises foregoing wireless power transfer.

19. An initiator inductive power transfer device that authenticates a responder inductive power transfer device, the initiator inductive power transfer device comprising a controller that:
   receives from the responder inductive power transfer device an initial certificate associated with the responder inductive power transfer device signed using a private key associated with an intermediate certificate authority (CA) certificate;

determines that the intermediate CA certificate is revoked;

determines, independently of the responder inductive power transfer device, when a replacement certificate for the initial certificate exists; and when the replacement certificate for the initial certificate exists, initiates inductive power transfer with the responder inductive power transfer device;

when the replacement certificate for the initial certificate does not exist, initiates wireless power transfer with the responder inductive power transfer device in accordance with a system policy of the initiator for untrusted devices.

20. The initiator inductive power transfer device of claim 19 wherein the controller initiates inductive power transfer with the responder inductive power transfer with the device in accordance with a system policy of the initiator inductive power transfer device for untrusted devices by foregoing inductive power transfer with the responder inductive power transfer device associated with the initial certificate.

21. The initiator inductive power transfer device of claim 19 wherein the controller initiates inductive power transfer with the responder inductive power transfer device in accordance with a system policy of the initiator for untrusted devices by initiating wireless power transfer with the responder inductive power transfer device at a lower power level than for trusted devices.

22. The initiator inductive power transfer device of claim 19, wherein the initiator inductive power transfer device is an inductive power transmitter.

23. The initiator inductive power transfer device of claim 19, wherein the initiator inductive power transfer device is an inductive power receiver.

* * * * *